United States Patent
Lazcano-Navarro

Patent Number: 5,112,387
Date of Patent: May 12, 1992

[54] PRODUCING STAINLESS STEELS IN ELECTRIC ARC FURNACES WITHOUT SECONDARY PROCESSING

[75] Inventor: Arturo Lazcano-Navarro, Coahuila, Mexico

[73] Assignee: Instituto Mexicano de Investigaciones Siderurgicas, Mexico

[21] Appl. No.: 748,049

[22] Filed: Aug. 21, 1991

[51] Int. Cl.⁵ ................................................ C22B 4/00
[52] U.S. Cl. ................................................... 75/10.42
[58] Field of Search ....................................... 75/10.42

[56] References Cited

U.S. PATENT DOCUMENTS

| | | | |
|---|---|---|---|
| 3,728,101 | 4/1973 | d'Entremont | 75/10.42 |
| 3,854,932 | 12/1974 | Bishop | 75/555 |
| 4,021,233 | 5/1977 | Johnson | 75/557 |
| 4,045,213 | 8/1977 | Leroy | 75/557 |
| 4,362,556 | 12/1982 | Kishida | 75/10.42 |
| 4,783,219 | 11/1988 | Mori | 75/512 |

Primary Examiner—Peter D. Rosenberg
Attorney, Agent, or Firm—Laurence R. Brown

[57] ABSTRACT

A method to produce stainless steels in electric arc furnaces without secondary processing is disclosed. The method includes three main steps: melting, oxidizing and reducing periods; during all of the steps natural gas is bottom blowed. During the oxidizing period an oxygen blow is accomplished preferably through a vertical lance and during the reducing period a chromium adjustment can be carried out by chromium ore additions.

6 Claims, 1 Drawing Sheet

PRODUCING STAINLESS STEELS IN ELECTRIC ARC FURNACES WITHOUT SECONDARY PROCESSING

BACKGROUND OF THE INVENTION

Stainless steel production was originally carried out in electric arc furnaces (EAF) but due to the impossibility to obtain a good and fast mixing of the melt and to the problems associated to get good reducing conditions after the oxidizing period, the added oxygen process (AOD) process was designed for a more economical production. In this process there still exist the problems associated with obtaining good reducing conditions and the bottom blowing of oxygen, plus argon in a technological aspect because of the high wearing rate produced in the AOD lining by oxygen tuyere blowing. Another drawback of the stainless steel production route is the inability of the AOD vessel to maintain a desired temperature in the melt: All energy available comes only from enthalpy delivered during the oxidizing period and the final reducing period is then limited in operations to be done because of melt cooling.

It is therefore an object of the present invention to provide a stainless steel production method in EAF without using the AOD process and having the ability to produce a good and fast melt mixing by bottom blowing a stirring gas.

Another object of the present invention is to provide a stainless steel production route in EAF without using the AOD process and having the ability to reinforce the oxidizing or reducing conditions by natural gas bottom blowing and the possibility to maintain the desired temperature by the electric arc operation.

SUMMARY OF THE INVENTION

The present invention relates to a method to produce stainless steels in an electric arc furnace overcoming the problems associated with the EAF-AOD route.

In the method object of the present invention an EAF is charged with high-carbon ferrochromium, ferrosilicon, stainless steel scrap, burnt lime and fluorspar, as in the conventional practice. During melting, a vigorous stirring is produced by natural gas bottom blowing in order to increase the interface contact area between the liquid metal that is being melted and the unmelted solid charge. This practice allows a better heat transfer thereby reducing the melting time and increasing the metallic yield. The natural gas bottom blowing is done through injection devices which are secured in the bottom wall of the EAF. The number and location of the injection devices to be installed will depend upon the furnace size and geometry. After melting and deslagging, the EAF electrodes are raised and an oxygen blow by lance is produced while the melt is being vigorously stirred by natural gas bottom blowing. In order to accomplish this oxidizing step, a modification in the EAF is required: installation of an oxygen lance system, introducing the $O_2$ lance through a fourth hole located in the center of the EAF roof and installing a charging door stopper device to avoid liquid bath ejections through the charging door while the bath is being vigorously stirred. The oxidizing period ends when the carbon content in the bath is around 0.03%. The metallurgical benefits of this practice are related with the lower oxidation level of the bath that results in a lower chromium oxidation and therefore a lower deoxidants consumption. At the end of the oxidizing period, after the decarburization blow, ferrosilicon is added as deoxidant and a post-stirring step is carried out only by natural gas bottom blowing. After sampling and deslagging, thermal and chemical adjustments are possible in the EAF, maintaining a natural gas stirring during said final steps.

In all steps the preferred stirring gas, is natural gas, but the method object of this invention can also be carried out using as stirring gas, argon, nitrogen and combinations of said gases.

DESCRIPTION OF THE INVENTION

Figure 1:
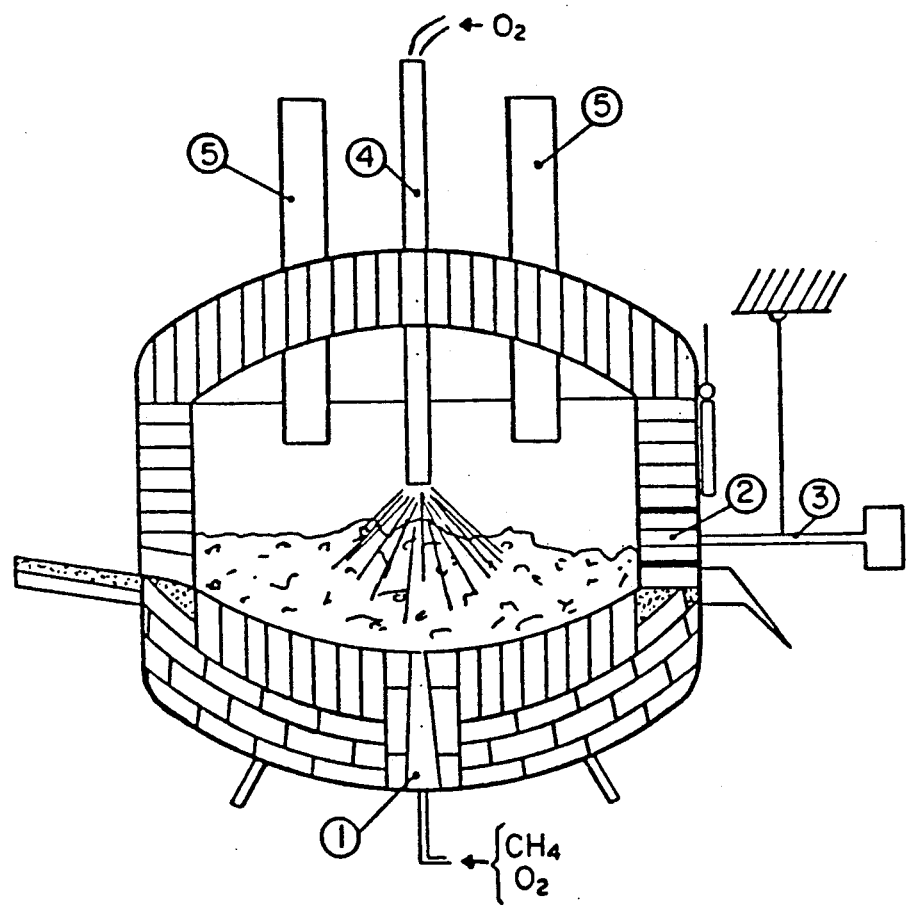
FIG. 1. Schematically illustrates a cross section of an EAF modified with the installation of: a charging door stopper device, bottom gas injection devices and an oxygen by lance system in the preferred embodiment.

Referring to FIG. 1, the gas injection devices are secured in the bottom wall of the EAF, and during melting, a vigorous stirring is produced by natural gas injection through said injection devices (1) while the oxygen lance (4) is at its upper position, Lateral oxygen lances such as the conventionally used can be operated during the melting period as in this usual practice.

After melting and deslagging, the electrodes (5) are raised to a position where they are not wetted by oxygen nor the stirred melt. Then the lance (4) is lowered to a blow position, injecting oxygen at a flow rate high enough to decarburize up to 0.03%C in the least period of time possible. Before oxygen blowing, the charging door stopper device (2) is positioned to avoid liquid bath ejections using means (3) to make said operation easier. During the oxygen blowing period, vigorous stirring with natural gas is maintained. In another embodiment. The oxygen blowing can be performed by bottom injection through tuyere type injection devices (1).

A deoxidant is added after the oxidizing period, and the charging door stopper device is previously removed. A post-stirring period is necessary for a chemical bath homogeneization and, if necessary, bath temperature can be increased by electric arc operation. Chemical adjustments are also done during this final reducing period, which is reinforced by the reducing nature of the natural gas that is being bottom injected. Said reinforced reducing conditions allow for chromium ore additions to incorporate metallic chromium in the bath.

Although the present invention has been described, it is to be understood that modifications and variations may be resorted without departing from the spirit of the invention. Such modifications and variations are considered to be within the scope of the present invention as defined by the appended claims.

What is claimed as new and desired to be protected by Letters Patent is set forth in the appended claims:

1. A method to produce stainless steels in an electric arc furnace without using a secondary processing vessel including the steps of:

charging a solid charge composed of stainless steel scrap, high-carbon ferrochromium, ferrosilicon and fluxes, melting said charge while stirring with a stirring gas blown through secured injection devices such as plugs in the bottom wall of the furnace, after melting and deslagging, raising electrodes in the furnace to an upper position, providing a charging door stopper and orifice in the furnace to avoid liquid bath ejections through said charging orifice while the bath is being stirred, then oxidizing with blowing oxygen while stirring with said stirring gas at an oxygen flow rate high enough to obtain a decarburization level of about 0.03% in a short time period, and thereafter suspending the blowing oxygen, removing the charging door stopper, and adding a reducer deoxidant while maintaining the stirring gas flow rate at a level high enough to obtain good mixing conditions.

2. The method of claim 1, wherein the oxidizing step is carried out by blowing oxygen into a furnace modified by selected from the group consisting of: positioning a vertical lance to operate in the center of the furnace roof; positioning a lateral lance through a side of the furnace,; positioning tuyere type gas injection devices in a bottom wall of the furnace, and combinations of the above systems.

3. The method of claim 1, including the step of introducing a stirring gas selected from the group consisting of natural gas, argon, nitrogen, and combinations of the above gases.

4. The method of claim 1, including the step of providing said charging door stopper with a refractory lid of same dimension as the orifice in such way that the internal furnace wall maintains its continuity in the door zone.

5. The method of claim 1, including the step introduced with the reducer deoxidant of adding chromium ore additions while stirring the melt with natural gas introduced at the bottom of the furnace.

6. The method of claim 1 further comprising the steps of sampling the charge, deslagging the charge, adding ferroalloys, and adjusting the arc to control temperature until tapping temperature is reached.

* * * * *